3,320,118
CATIONIC STARCH COMPLEX
William C. Black and Vernon L. Winfrey, Cedar Rapids, Iowa, assignors to Penick & Ford, Ltd., Cedar Rapids, Iowa, a corporation of Delaware
No Drawing. Filed Nov. 21, 1960, Ser. No. 70,426
12 Claims. (Cl. 162—175)

The present invention relates to a cationic starch complex, the method of preparing the complex, and the use of the complex in treating cellulosic material.

During the last ten years there have been numerous attempts to employ the starch etherification reaction to introduce basic nitrogen groups into the starch molecule, and thereby obtain a starch having distinctly cationic properties. Moreover, it has been recognized that cationic starches are potentially valuable reagents for the treatment of paper and other cellulosic material, providing the cationic starch can be manufactured and sold at a sufficiently low price. Although the use of a cationic starch in the manufacture of paper would be more desirable than the conventional unmodified starch, the present utilization of cationic starch by the paper industry represents only a very small fraction of the starch employed in manufacturing paper. This is apparently due to the premium price at which it is necessary to sell cationic starch. It is known that a cationic starch has increased effectiveness due to the fact that its cationic nature causes it to be retained to a greater degree by the anionic cellulose fibers than is normal unmodified or native starch.

The production of cationic starch through the etherification reaction requires the use of relatively expensive reagents, and the efficiency of the etherification reaction is limited by the need to produce a product which can be dewatered by filtration. Etherified cationic starch can also be processed by a drum drying procedure, but this procedure also adds to the cost of the product and the market for drum dried starch is relatively limited.

It is therefore a principal object of the present invention to substantially overcome the problems and limitations described above with respect to cationic starches. A more specific object is to provide a cationic starch and method of producing it which avoids the use of expensive reagents and the cost of carrying out a large scale etherification reaction in an aqueous medium, and subsequent dewatering of the reaction product. Further objects and advantages will be indicated in the following detailed specification.

This invention is based in part on the discovery that a cationic starch composition can be formed through a complexing mechanism as distinguished from the well-known etherification reaction employed in such prior processes as described in Patent No. 2,813,093. It has been further discovered that the cationic starch complex of this invention can be formed by a simple contacting or mixing procedure wherein an aqueous dispersion of gelatinized starch is mixed and contacted with a small quantity of a relatively inexpensive cationic fatty nitrogen derivative. The cationic fatty acid derivative can be dry blended with regular starch, and upon gelatinization of the starch, the complex will form spontaneously. Alternatively, the fatty acid derivative can be added to the starch while it is being cooked, or subsequent to gelatinization and prior to use. With any of these procedures, it is apparent that the manufacturing costs associated with the starch etherification reaction are completely eliminated.

A wide variety of cationic fatty nitrogen compounds, such as fatty amines and fatty amine derivatives, can be used in practicing the present invention. However, two requirements should be observed. The molecules of the fatty amines and derivatives thereof should contain at least one fatty aliphatic chain and the aliphatic chains thus provided should contain predominately from 12 to 22 carbon atoms. The term "fatty" as used herein means derived from fatty acids, such as palmitic acid, stearic acid, etc. Apparently the long chain unbranched aliphatic groups associate with the gelatinized starch molecules and are responsible for the desired complexing of the starch with the cationic fatty nitrogen compound. The molecules of the fatty nitrogen compound should also contain at least one basic nitrogen to impart the desired cationic properties. The basic nitrogen may be a primary, secondary, or tertiary amine group, or the compound may contain a quaternary ammonium group. When more pronounced cationic properties are desired, tertiary amine or quaternary ammonium groups may be preferable. Alternatively, the compound can contain a plurality of amine groups, such as diamine compounds containing both a primary amine group and a secondary amine group. Other variations will readily occur to those skilled in the art.

In practicing the present invention, the relative proportions between the starch and the fatty nitrogen compound may be varied considerably, depending on the degree of cationic activity of the fatty nitrogen compound. In some cases, as little as .1 part by weight of the fatty compound per 100 parts of starch will impart cationic properties to the starch, but it will usually be desirable to complex at least .5 part by weight of the fatty compound with each 100 parts of starch. For some purposes, up to 10 parts of the compound per 100 parts of starch may be used, but usually from 1 to 2 parts of the fatty nitrogen compound per 100 parts of starch will be sufficient.

The term "starch" as used in this application is intended to refer to any amylaceous or starch-containing material or mixtures or modifications thereof. The starch may be crude or refined and may be derived from any sources including corn, wheat, potato, tapioca, sago, rice, etc.

Illustrative of the cationic fatty compounds which may be used in practicing this invention are the following: (1) primary amines like hexadecylamine, octadecylamine, and mixed primary amines derived from tallow, soybean oil and similar fats; (2) secondary amines such as methyloctadecylamine, ethylhexadecylamine, and mixtures of such amines where the long chain aliphatic groups are derived from natural fatty acid mixtures; (3) polyamines like the alkyltrimethylenediamines where the alkyl groups are derived from natural mixtures of fatty acids; (4) tertiary amines such as dimethyloctadecylamine, diethylhexadecylamine and mixtures of such compounds; and (5) quaternary ammonium compounds like trimethylhexadecyl ammonium salts, dialkyl ammonium salts where the alkyl groups are derived from natural fats, and similar compounds. For most purposes, fatty nitrogen compounds containing only one long chain unbranched aliphatic group (e.g., $C_{12}$ to $C_{22}$) will be preferred.

In preparing the complexes, the cationic fatty nitrogen compounds should be used in a "water-dispersible" form. The term "water-dispersible" as used herein includes water solubility. For example, the acetate or hydrochloride salts will usually be suitable. The compounds may also be solubilized or made dispersible in other ways such as by condensing them with a sufficient amount of ethylene oxide to obtain water solubility or dispersibility without unduly suppressing cationic properties. Since these compounds in their "water-dispersible" forms are well known and are readily available commercially, it is not believed necessary to further discuss them herein.

When the water-soluble or dispersible cationic fatty nitrogen compound is introduced into an aqueous dispersion of gelatinized starch, a complex forms readily. No special conditions or procedures are required beyond mixing the fatty compound with a starch suspension. The temperatures and pH's at which starch is normally processed can be used.

For convenience of shipping and handling, the fatty nitrogen compound may be dry mixed and blended with dry, granule starch, the proportions being as previously indicated. When the starch is formed into a water suspension and cooked in the usual way, the desired complex will begin to form as soon as the starch has become swollen to a non-filterable condition. Preferably, the starch is employed in a gelatinized state such as is obtained by heating a water suspension of the starch to a temperature of 160° to 190° F. It will be understood that the optimum gelatinization temperature will vary somewhat with the type of starch used. The fatty nitrogen compound may be present during the heating and gelatinization, or may be added to the starch paste after cooking. The starch may be prepared or cooked by any of the presently used procedures, such as those involving direct steam (as steam jets) or indirect heat (jacketed tanks or steam coils), and may be either a batch or continuous process. The concentration may be the same as presently used, which according to the type of facilities used, normally falls within the range of 0.25 to 0.75 lb. per gallon, or about 2.4 to 8.3%. However, by the use of special cooking equipment suitable for handling high viscosity pastes, starch can be gelatinized in concentrations as high as 30 to 40%.

By way of further illustrating the method of this invention, reference is made to the following example: A standard commercial grade of cornstarch in the unswollen granular form is combined with water to form a 5% suspension or dispersion. The dispersion is heated to a temperature of 180–185° F. to gelatinize the starch. Tallow trimethylenediamine diacetate is then added slowly to the gelatinized starch with agitation until the amount added corresponds to approximately 1% of the weight of the starch on a dry basis. The starch complex is then ready for use, and may now be added to a paper furnish. The furnish will contain the wood pulp from which the paper is to be formed, and this will be processed by passing the furnish over the forming screen, and completing the manufacture of the paper according to standard procedures. The resulting paper will contain the cationic starch complex dispersed through the fibers thereof. For example, the paper may contain from .1 to 5% of the starch complex. Usually less than 3% will be sufficient. The cationic starch complex will exhibit improved retention properties. Among other advantages, the cationic starch can be expected to increase the strength of the paper and to facilitate the retention of pigments and dyes.

Additional examples are as follows: Instead of the diamine compound specified in the foregoing example, other cationic fatty acid derivatives are used, such as tallow amine acetate, hexadecyl or octadecyldimethylamine acetate, and hexadecyl or octadecyltrimethyl ammonium chloride. Compounds having unbranched aliphatic groups containing from 16 to 18 carbon atoms are preferred. The procedure described is otherwise applicable, or the fatty nitrogen compound is mixed with the dry starch prior to suspension or added to the suspension prior to cooking.

A more detailed example is as follows: A 1.5% consistency paper pulp slurry was prepared by beating for 30 minutes in a laboratory Valley Beater a mixture of 290 gm. sulfite pulp and 29 mg. titanium dioxide pigment in 21 liters of water. Shortly before the end of the beating cycle 180 ml. of a 10% aluminum sulfate (papermakers alum) solution was added to lower the pH to 4.5–5.0, as is customary for rosin sized pulps.

A starch paste was prepared by beating at 185° F. for 15 minutes a 2.5% slurry of unmodified cornstarch. Half of this was used as mentioned below. While still hot, to the other half was added with thorough mixing an alkyl trimethylene diamine acetate in an amount equivalent to 1% on the starch basis. The alkyl groups were of mixed chain lengths being those derived from tallow.

To portions of the above pulp slurry, quantities of the above starch pastes were added in amounts as shown below and gently agitated for several minutes. The mixtures were then made into 8½" x 8½" hand sheets using a Valley laboratory sheet mould. To the dilution water in the sheet mould was added sufficient alum solution to maintain the desired 4.5–5.0 pH. After forming, the sheets were pressed in a hydraulic press and then dried in a cylindrical steam heated hot plate. After conditioning overnight at 70° F. and 50% R.H., the sheets were weighed, tested for strength with a Mullen tester, and ashed. To compensate for the variation in sheet weight, the Mullen values are converted to a 100 gm. sheet basis. Each is an average of four tests on each of 3 sheets. The ash values are similarly converted to the weight in grams per average sheet of the three tested in each set.

|  | Mullen per 100 gm. sheet | Ash, avg. per sheet gm. | Wt., avg. per sheet gm. | Fiber wt. per sheet gm. | Ash added to pulp per sheet gm. | Percent Pigment retention |
|---|---|---|---|---|---|---|
| Blank, no starch | 91 | 0.210 | 3.62 | 3.41 | 0.34 | 62 |
| 3% starch only | 112 | 0.139 | 3.05 | 2.91 | 0.29 | 48 |
| 1½% starch, 1% Duomac T on starch | 142 | 0.226 | 3.88 | 3.65 | 0.37 | 61 |
| 3% starch, 1% Duomac T on starch | 128 | 0.199 | 3.38 | 3.19 | 0.32 | 62 |

Duomac T is the trademark for a product of Armour and Company which consists essentially of tallow trimethylene diamine acetate.

Not only is the sheet strength materially improved by the use of starch containing 1% (on starch) of the fatty diamine acetate, but the decrease in pigment retention frequently resulting from the addition of starch to the furnish is entirely eliminated.

While in the foregoing specification this invention has been described in relation to certain specific embodiments thereof and many details have been set forth for purpose of illustration, it will be apparent to those skilled in the art that the invention is susceptible to additional embodiments and that many of the details described herein can be varied without departing from the basic principles of the invention.

We claim:

1. A starch composition consisting essentially of the complex of gelatinized unmodified starch and a quaternary ammonium compound which contains at least one fatty aliphatic group having from 12 to 22 carbon atoms, said gelatinized starch and said quaternary ammonium compound being united by a complex-type linkage and said composition being substantially free of ether linkages between said gelatinized starch and said quaternary ammonium compound, said composition containing from .1 to 10 parts by weight of said quaternary ammonium compound per 100 parts of said starch.

2. The starch composition of claim 1 in which said quaternary ammonium compound contains a single fatty aliphatic group having from 12 to 22 carbon atoms.

3. The composition of claim 1 wherein said quaternary ammonium compound is an alkylpolymethyl quaternary ammonium compound wherein the alkyl group contains from 16 to 18 carbon atoms.

4. A starch composition consisting essentially of the complex of gelatinized starch and a fatty aliphatic quaternary ammonium compound which contains a single fatty aliphatic group having from 12 to 22 carbon atoms, said starch being esentially unmodified, said gelatinized starch and said quaternary ammonium compound being united by a complex-type linkage and said composition being substantially free of ether linkages between said gelatinized starch and said quaternary ammonium compound, said composition containing from .5 to 5 parts by weight of said quaternary ammonium compound per 100 parts of said starch.

5. A starch composition consisting of the complex of gelatinized unmodified starch and a quaternary ammonium compound which contains one fatty aliphatic group having from 12 to 22 carbon atoms, said quaternary ammonium compound consisting of carbon, hydrogen, nitrogen and one anion, said composition containing from .1 to 10 parts by weight of said quaternary ammonium compound per 100 parts of said starch.

6. The method of modifying starch to provide cationic properties, comprising contacting and mixing gelatinized starch unmodified in an aqueous suspension with a quaternary ammonium compound to form a complex of said gelatinized starch and said compound, said compound being an aliphatic fatty quaternary ammonium compound which contains at least one fatty aliphatic group having from 12 to 22 carbon atoms, said contacting and mixing being carried out under non-etherifying conditions, and said quaternary compound being employed in the proportion of .1 to 10 parts by weight per 100 parts of said starch.

7. The method of claim 6 in which said quaternary ammonium compound contains a single fatty aliphatic group having from 16 to 18 carbon atoms.

8. The method of modifying starch to provide cationic properties, comprising contacting and mixing gelatinized starch in an aqueous suspension with a quaternary ammonium compound to form a complex of said gelatinized starch and said compound, said compound being a fatty aliphatic quaternary ammonium compound which contains one aliphatic group having from 12 to 22 carbon atoms, said quaternary ammonium compound consisting of carbon, hydrogen, nitrogen and one anion, and said compound being employed in the proportion of .5 to 5 parts by weight per 100 parts of said starch.

9. The paper characterized by containing from .1 to 3% by weight of a starch complex distributed therethrough and in intimate association with the cellulosic fibers thereof, said complex consisting essentially of gelatinized unmodified starch and a quaternary ammonium compound which contains one fatty aliphatic group having from 12 to 22 carbon atoms, said gelatinized starch and said quaternary compound being united by a complex-type linkage and said complex being substantially free of ether linkages between said gelatinized starch and said quaternary compound, said complex containing from .1 to 10 parts by weight of said quaternary compound per 100 parts of said starch.

10. A paper characterized by containing from .1 to 3% by weight of starch complex distributed therethrough and in intimate association with the cellulosic fibers thereof, said complex comprising gelatinized unmodified starch associated with from .5 to 5 parts by weight of a quaternary ammonium compound per 100 parts of said starch, said quaternary ammonium compound containing a single aliphatic group having from 12 to 22 carbon atoms, said quaternary ammonium compound consisting of carbon, hydrogen, nitrogen and one anion.

11. The paper of claim 9 wherein said quaternary ammonium compound contains a single fatty aliphatic group and wherein said aliphatic group contains from 16 to 18 carbon atoms.

12. A starch composition for sizing paper comprising gelatinized unmodified starch reacted with a quaternary ammonium compound having a long chain aliphatic group of from 12 to 22 carbon atoms, said quaternary ammonium compound consisting of carbon, hydrogen and nitrogen and one anion, said composition having been formed by cooking in water essentially unmodified starch in the presence of said quaternary ammonium compound at a temperature of about 160 to 190° F. to effect gelatinization of the starch.

References Cited by the Examiner

UNITED STATES PATENTS

| | | | |
|---|---|---|---|
| 2,170,272 | 8/1939 | Walsh | 162—175 |
| 2,935,436 | 5/1960 | Caldwell et al. | 162—175 |
| 2,965,518 | 12/1960 | Meisel | 260—233.3 X |
| 2,970,140 | 1/1961 | Hullinger et al. | 117—156 X |

DONALL H. SYLVESTER, *Primary Examiner.*

R. D. NEVIUS, M. O. WOLK, *Examiners.*

R. F. I. CONTE, J. H. NEWSOME, *Assistant Examiners.*